(12) United States Patent
Jhang et al.

(10) Patent No.: US 11,801,834 B2
(45) Date of Patent: Oct. 31, 2023

(54) VEHICLE POSITIONING METHOD VIA DATA FUSION AND SYSTEM USING THE SAME

(71) Applicant: AUTOMOTIVE RESEARCH & TESTING CENTER, Changhua Hsien (TW)

(72) Inventors: Tong-Kai Jhang, Changhua Hsien (TW); Jin-Yan Hsu, Changhua Hsien (TW); You-Sian Lin, Changhua Hsien (TW); Ji-Fan Yang, Changhua Hsien (TW); Chien-Hung Yu, Changhua Hsien (TW); Yi-Zhao Chen, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 37 days.

(21) Appl. No.: 17/557,688

(22) Filed: Dec. 21, 2021

(65) Prior Publication Data

US 2023/0192080 A1 Jun. 22, 2023

(51) Int. Cl.
*B60W 30/12* (2020.01)
*G01S 19/43* (2010.01)
*G01S 19/48* (2010.01)

(52) U.S. Cl.
CPC ............ *B60W 30/12* (2013.01); *G01S 19/43* (2013.01); *G01S 19/48* (2013.01); *B60W 2520/06* (2013.01); *B60W 2520/10* (2013.01); *B60W 2520/105* (2013.01); *B60W 2520/12* (2013.01); *B60W 2520/125* (2013.01); *B60W 2520/14* (2013.01); *B60W 2520/20* (2013.01); *B60W 2540/18* (2013.01); *B60W 2552/53* (2020.02); *B60W 2556/35* (2020.02); *B60W 2556/60* (2020.02); *B60W 2720/10* (2013.01); *B60W 2720/12* (2013.01)

(58) Field of Classification Search
CPC ..................................... B60W 30/12
See application file for complete search history.

(56) References Cited

U.S. PATENT DOCUMENTS

| | | | |
|---|---|---|---|
| 2020/0109954 A1* | 4/2020 | Li | G01C 21/3841 |
| 2022/0028262 A1* | 1/2022 | Devassy | G06F 16/22 |
| 2022/0187079 A1* | 6/2022 | Matsumoto | B60W 30/10 |

* cited by examiner

Primary Examiner — Imran K Mustafa
(74) Attorney, Agent, or Firm — Rosenberg, Klein & Lee (57) ABSTRACT

A vehicle positioning method via data fusion and a system using the same are disclosed. The method is performed in a processor electrically connected to a self-driving-vehicle controller and multiple electronic systems. The method is to perform a delay correction according to a first real-time coordinate, a second real-time coordinate, real-time lane recognition data, multiple vehicle dynamic parameters, and multiple vehicle information received from the multiple electronic systems with their weigh values, to generate a fusion positioning coordinate, and to determine confidence indexes. Then, the method is to output the first real-time coordinate, the second real-time coordinate, and the real-time lane recognition data that are processed by the delay correction, the fusion positioning coordinate, and the confidence indexes to the self-driving-vehicle controller for a self-driving operation.

10 Claims, 8 Drawing Sheets

VEHICLE POSITIONING METHOD VIA DATA FUSION AND SYSTEM USING THE SAME

BACKGROUND OF THE INVENTION

1. Field of the Invention

The present invention relates generally to a vehicle positioning method and a vehicle positioning system, and more particularly to a vehicle positioning method via data fusion and a system using the same.

2. Description of Related Art

The self-driving vehicle is one of the major transportation tools in the future. Besides, the positioning technique of the self-driving vehicle is the popular subject matter for research and development. For example, in order to implement the self-driving control greater than Level 3 defined by the Society of Automotive Engineers (SAE), the simultaneous localization and mapping (SLAM) system is commonly used nowadays. However, the ability of the SLAM system may be insufficient to deal with the complicated and variant road circumstances. The reasons include:

1. The updating rate for the vehicle positioning information provided by the SLAM system is lower than 10 Hz, causing a positioning delay because the time to update a new vehicle positioning information is too long.
2. The road circumstances may include highly similar objects, such as trees and buildings, or lack recognizable features due to shading. Besides, the features in the road circumstances may change suddenly. Resulted from the issues mentioned above, there would be discrepancies between the actual road circumstances and the features recognized by the SLAM system. Therefore, the positioning signals of the SLAM system may be temporarily unavailable and floating. The SLAM system may fail to immediately locate the position of the self-driving vehicle.
3. As mentioned above, the positioning signals of the SLAM system may be temporarily unavailable and floating. In other words, a currently generated positioning signal may be wrong. That may cause the self-driving vehicle to navigate along a wrong path. Traffic accidents or emergency braking occurs, then.

SUMMARY OF THE INVENTION

An objective of the present invention is to provide a vehicle positioning method via data fusion and a system using the same, to overcome the problems including low updating rate for the vehicle positioning information, positioning delay, and failure to immediately locate the position of the self-driving vehicle as in the prior art.

The vehicle positioning method via data fusion of the present invention is performed by a processor electrically connected to a self-driving-vehicle controller and multiple electronic systems, and comprises steps of:

step (a): receiving a first real-time coordinate, a second real-time coordinate, real-time lane recognition data, multiple vehicle dynamic parameters, and multiple vehicle information from the multiple electronic systems respectively;

step (b): as time goes on, computing and storing multiple displacement data according to the vehicle dynamic parameters and the vehicle information that are successively received;

step (c): performing a delay correction to the first real-time coordinate, the second real-time coordinate, and the real-time lane recognition data according to the displacement data;

step (d): determining levels of the first real-time coordinate and the second real-time coordinate;

step (e): computing a dynamic estimated coordinate according to the displacement data and one of the first real-time coordinate and the second real-time coordinate that has a better level;

step (f): generating lateral position data according to one of the first real-time coordinate and the second real-time coordinate that has the better level and map information, and determining whether a difference between the lateral position data and the real-time lane recognition data is less than a tolerable value, and when the processor determines that the difference is less than the tolerable value, computing a lateral auxiliary coordinate according to one of the real-time lane recognition data and the lateral position data; and
one of the first real-time coordinate and the second real-time coordinate that has the better level;

step (g): generating a fusion positioning coordinate according to the first real-time coordinate and a weight value thereof, the second real-time coordinate and a weight value thereof, the dynamic estimated coordinate and a weight value thereof, and the lateral auxiliary coordinate and a weight value thereof;

step (h): respectively determining confidence indexes of the first real-time coordinate, the second real-time coordinate, the dynamic estimated coordinate, and the lateral auxiliary coordinate; and step (i): outputting the first real-time coordinate, the second real-time coordinate, and the real-time lane recognition data that are processed by the delay correction, the fusion positioning coordinate, and the confidence indexes to the self-driving-vehicle controller for a self-driving operation.

The vehicle positioning system via data fusion of the present invention comprises:

a self-driving-vehicle controller;

multiple electronic systems respectively outputting a first real-time coordinate, a second real-time coordinate, real-time lane recognition data, multiple vehicle dynamic parameters, and multiple vehicle information; and a processor electrically connected to the self-driving-vehicle controller and the electronic systems to respectively receive the first real-time coordinate, the second real-time coordinate, the real-time lane recognition data, the vehicle dynamic parameters, and the vehicle information from the electronic systems, and computing and storing multiple displacement data according to the vehicle dynamic parameters and the vehicle information that are successively received;

the processor performing a delay correction to the first real-time coordinate, the second real-time coordinate, and the real-time lane recognition data according to the displacement data;

the processor determining levels of the first real-time coordinate and the second real-time coordinate, computing a dynamic estimated coordinate according to the displacement data and one of the first real-time coordinate and the second real-time coordinate that has a better level, generating lateral position data according to one of the first real-time coordinate and the second real-time coordinate that has the better level and map information, and determining whether a difference between the lateral position data and the real-time lane recognition data is less than a tolerable value, and when the processor determines that the difference is less than the tolerable value, computing a lateral auxiliary coordinate according to:
one of the real-time lane recognition data and the lateral position data; and
one of the first real-time coordinate and the second real-time coordinate that has the better level;
the processor generating a fusion positioning coordinate according to the first real-time coordinate and a weight value thereof, the second real-time coordinate and a weight value thereof, the dynamic estimated coordinate and a weight value thereof, and the lateral auxiliary coordinate and a weight value thereof, and respectively determining confidence indexes of the first real-time coordinate, the second real-time coordinate, the dynamic estimated coordinate, and the lateral auxiliary coordinate;
the processor outputting the first real-time coordinate, the second real-time coordinate, and the real-time lane recognition data that are processed by the delay correction, the fusion positioning coordinate, and the confidence indexes to the self-driving-vehicle controller for a self-driving operation.

The effects of the method and the system of the present invention include:
1. The present invention makes use of the vehicle dynamic parameters. The vehicle dynamic parameters are generated by an inertial measurement unit (IMU). Hence, the present invention may update the displacement data at a rate around 50 Hz. The displacement data is thus added to or integrated into the first real-time coordinate and the second real-time coordinate, such that the updating rate for locating the position of the self-driving vehicle is improved, and the positioning delay is compensated.
2. Although the positioning signal is temporarily unavailable and floating, the present invention can generate the fusion positioning coordinate by at least adding the displacement data and send the fusion positioning coordinate to the self-driving-vehicle controller, such that the effect of real-time positioning is still achieved.
3. By providing the self-driving-vehicle controller with the confidence indexes of the first real-time coordinate, the second real-time coordinate, the dynamic estimated coordinate, and the lateral auxiliary coordinate, the robustness of the control system can be enhanced. When the processor determines that the confidence indexes are low, the processor can perform a secure defensive driving in advance.

DETAILED DESCRIPTION OF PREFERRED EMBODIMENT(S)

Figure 1:
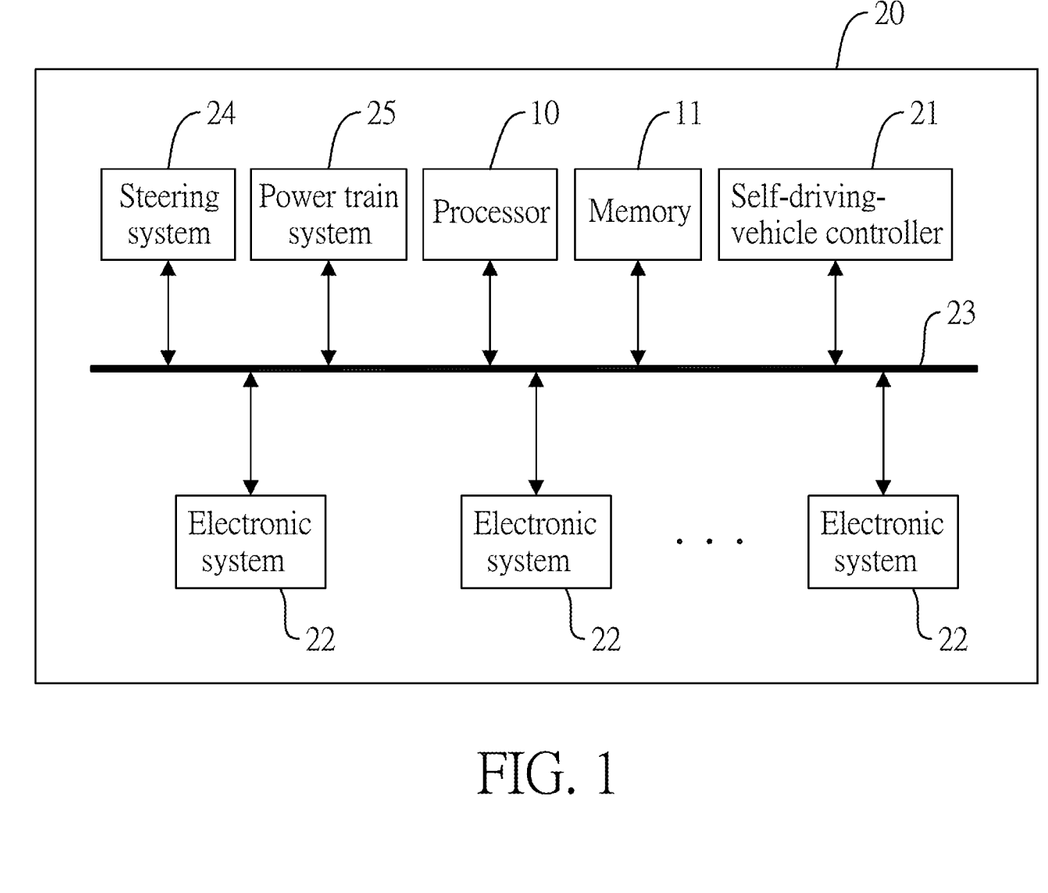
FIG. 1 is a block diagram of the vehicle positioning system via data fusion of the present invention.
Figure 2A:
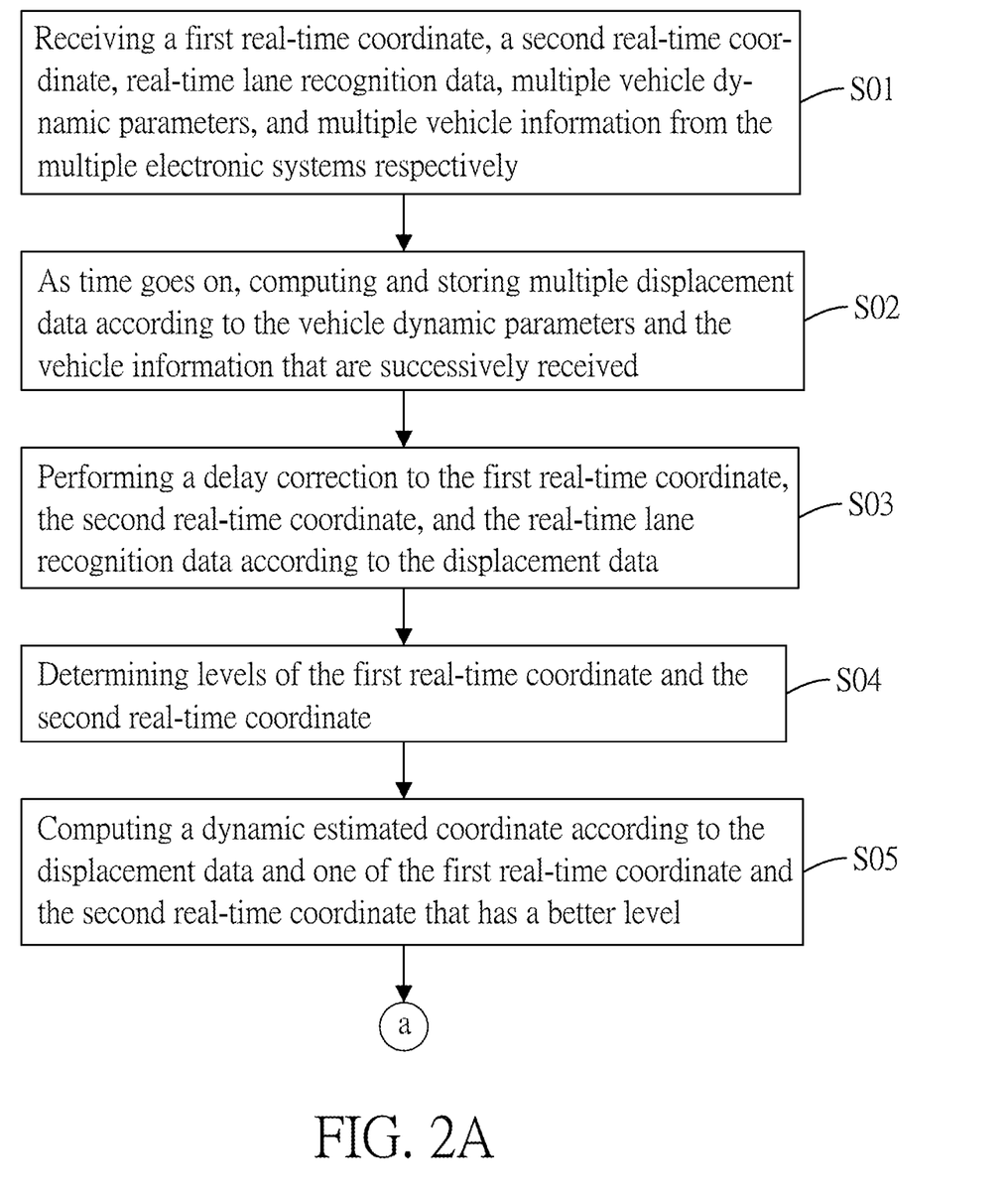
FIG. 2A and FIG. 2B are flow charts of the vehicle positioning method via data fusion of the present invention.
Figure 2B:
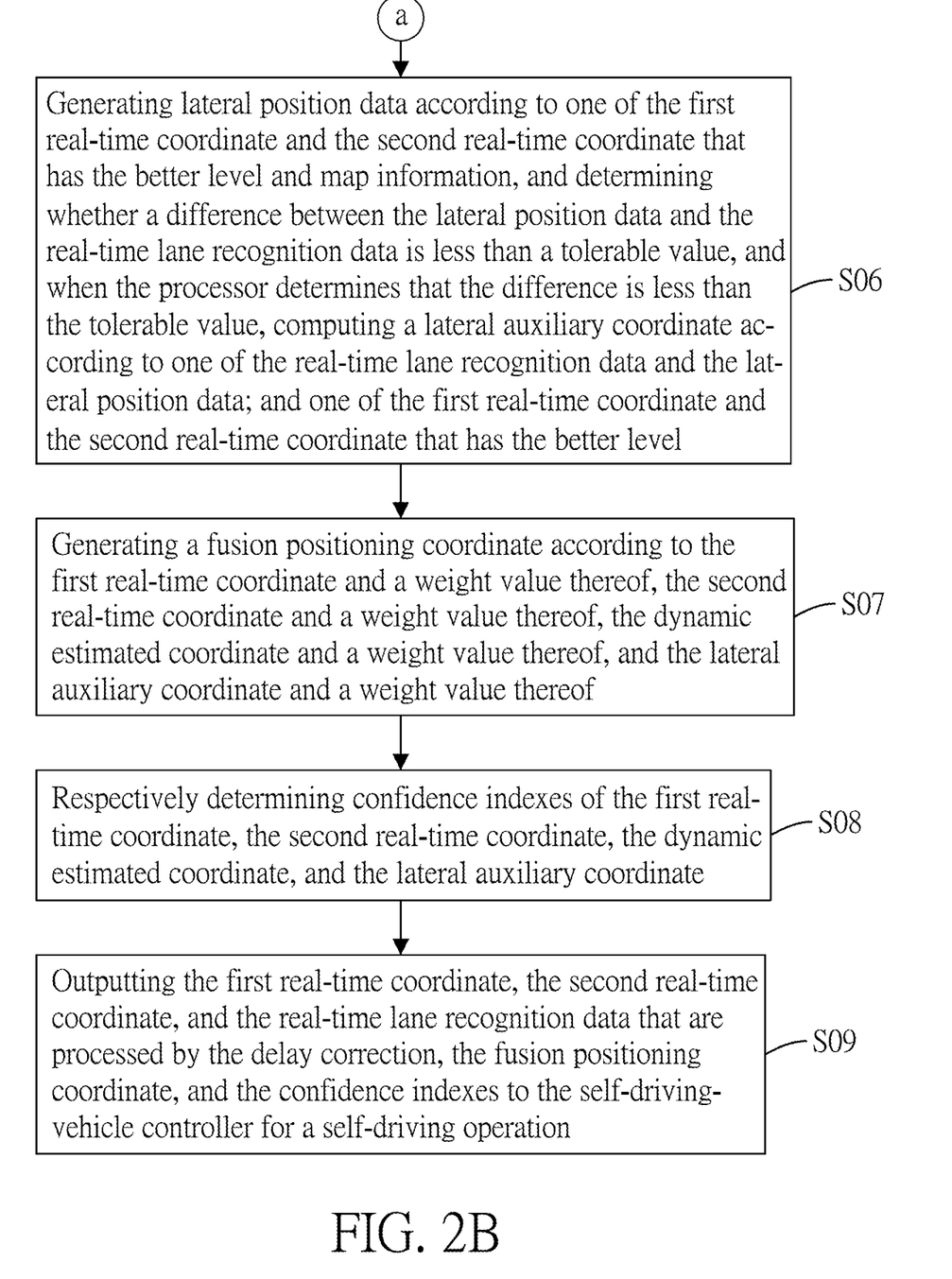

The present invention is a vehicle positioning method via data fusion and a system using the same. With reference to FIG. 1, the system of the present invention comprises a self-driving-vehicle controller 21, multiple electronic systems 22, and a processor 10. The method of the present invention is performed in the processor 10. The self-driving-vehicle controller 21, the electronic systems 22, and the processor 10 are mounted in a self-driving vehicle 20. The processor 10 and the self-driving-vehicle controller 21 may be integrated circuit (IC) chips. The processor 10 is electrically connected to the self-driving-vehicle controller 21 and the electronic systems 22 for data transmission. The processor 10, the self-driving-vehicle 21, and the electronic systems 22 may communicate with each other via a data bus 23. The data bus 23 may be, but is not limited to, a Controller Area Network Bus (CAN Bus). The self-driving-vehicle controller 21 communicates with a steering system 24 (such as a steering-wheel transmission mechanism), a power train system 25 (such as an engine and a motor), a braking system (not shown in the figures), and so on, for the purpose of self-driving operations such as speed control, braking control, navigating control, and so on. In the present invention, the processor 10 receives positioning data and sensing data from the electronic systems 22 and merges the positioning data and the sensing data to generate positioning information and its confidence of the self-driving vehicle 20. With reference to the flow chart in FIGS. 2A, 2B, and 3, the embodiments of the present invention are disclosed as follows.

Figure 4:
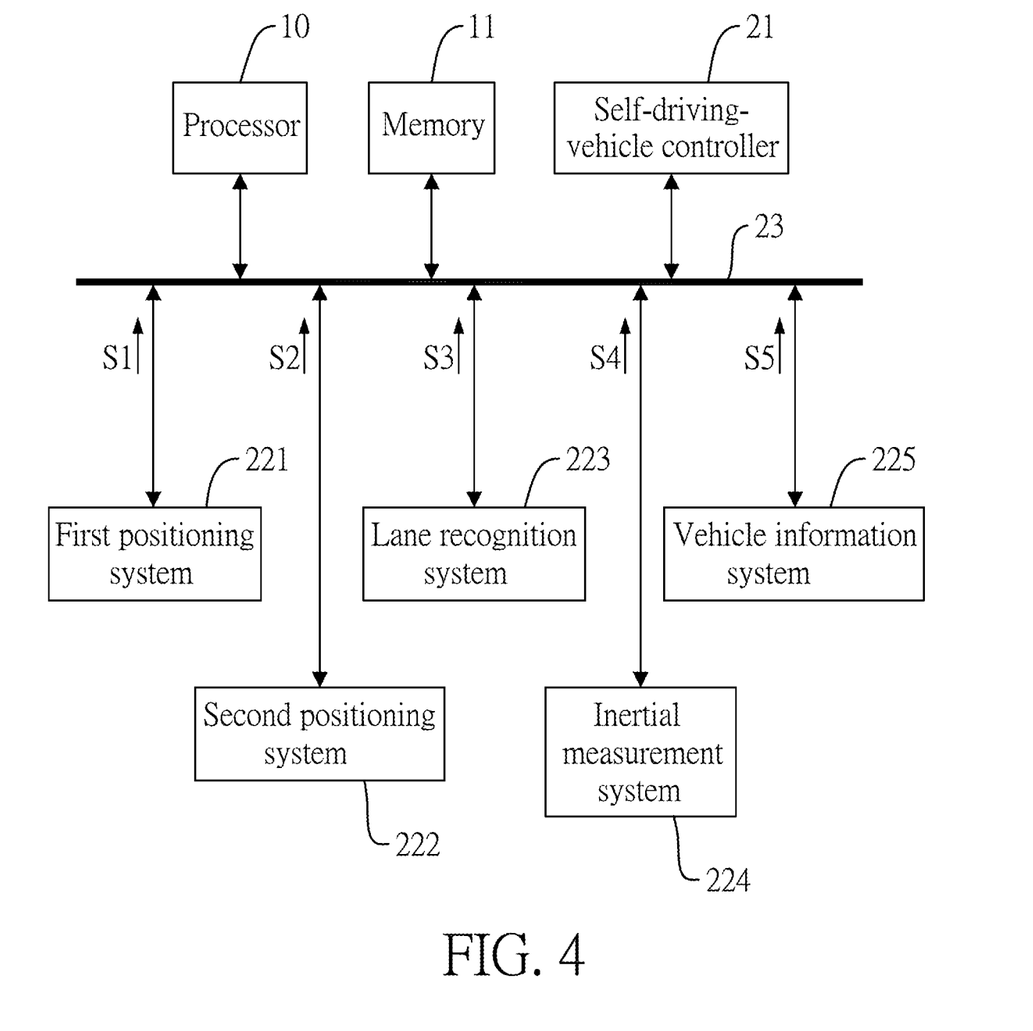
FIG. 4 is a block diagram of the vehicle positioning system via data fusion of the present invention.

STEP S01: Data collection. The processor 10 receives a first real-time coordinate S1, a second real-time coordinate S2, real-time lane recognition data S3, multiple vehicle dynamic parameters S4, and multiple vehicle information S5 from the electronic systems 22 respectively. For example, with reference to FIG. 4, the electronic systems 22 may comprise a first positioning system 221, a second positioning system 222, a lane recognition system 223, an inertial measurement system 224, and a vehicle information system 225. The first positioning system 221 outputs the first real-time coordinate S1. The second positioning system 222 outputs the second real-time coordinate S2. The lane recognition system 223 outputs the real-time lane recognition data S3. The inertial measurement system 224 outputs the vehicle dynamic parameters S4. The inertial measurement system 224 may be also called an inertial measurement unit (IMU). The vehicle information system 225 outputs the vehicle information S5.

Figure 7:
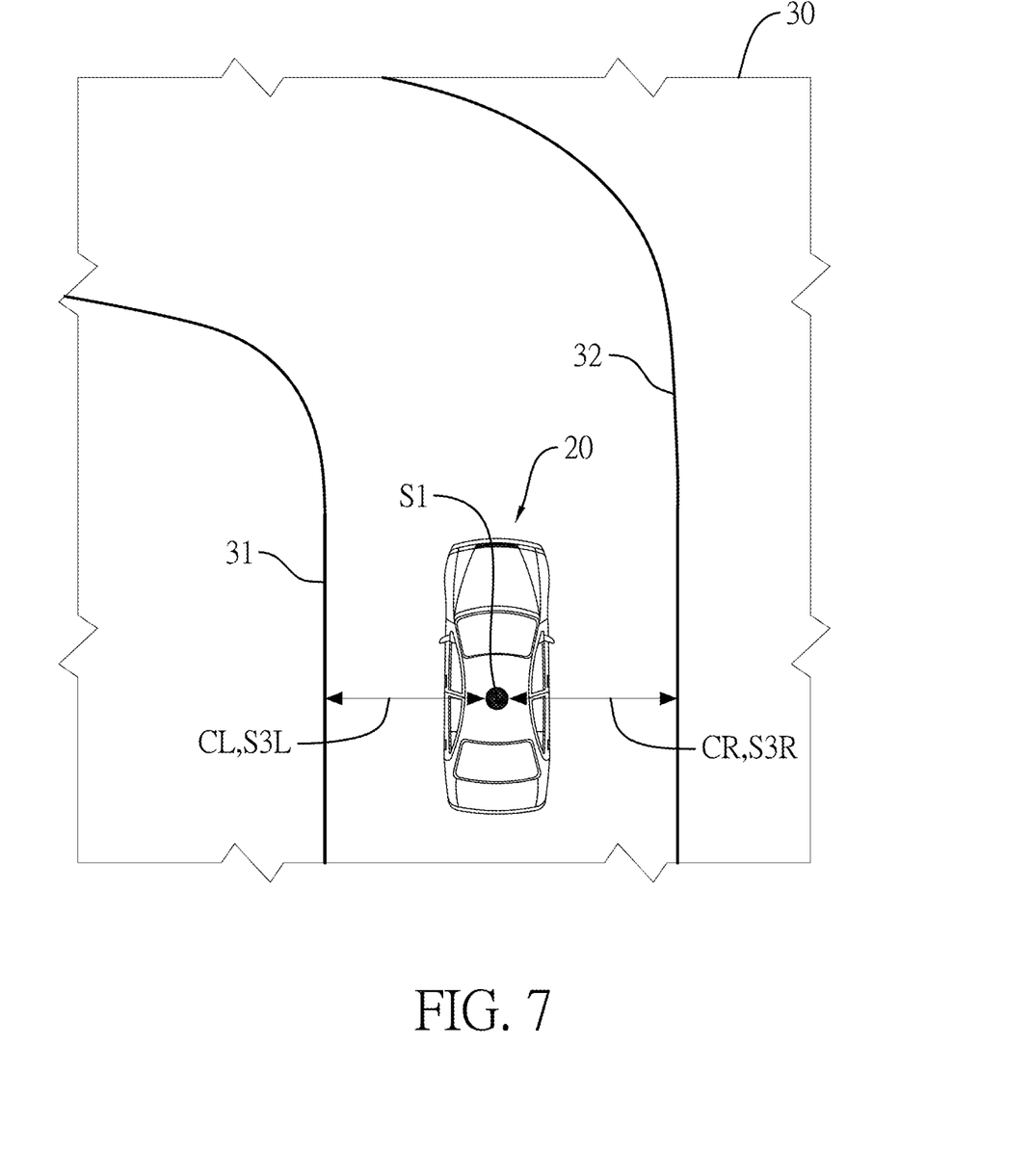
FIG. 7 is a schematic view depicting the generation of the lateral position data based on the map information, and the comparison between the lateral position data and the real-time lane recognition data in the present invention.

In the present invention, the first positioning system 221 is a simultaneous localization and mapping (SLAM) system, such that the first real-time coordinate S1 is an absolute coordinate of SLAM. The absolute coordinate of SLAM comprises positioning information such as longitude and latitude. Besides, the first positioning system 221 also outputs accompanied SLAM information corresponding to the absolute coordinate of SLAM at the same time. The accompanied SLAM information comprises a SLAM computing time, a score, and a number of times of iteration. The SLAM computing time includes an overall time spent by the first positioning system 221 to receive signals from its sensors, transmit the signals, process the signals, and output the absolute coordinate of SLAM. The second positioning system 222 is a real-time kinematic-global positioning system (RTK-GPS), such that the second real-time coordinate S2 is an absolute coordinate of RTK-GPS. The absolute coordinate of RTK-GPS comprises positioning information such as longitude and latitude. Besides, the second positioning system 222 also outputs accompanied RTK-GPS information corresponding to the absolute coordinate of RTK-GPS at the same time. The accompanied RTK-GPS information comprises an RTK-GPS computing time, an RTK state, and an INS (Inertial Navigation System) state. The RTK-GPS computing time includes an overall time spent by the second positioning system 222 to receive signals from its sensors, transmit the signals, process the signals, and output the absolute coordinate of RTK-GPS. With reference to FIG. 7, the real-time lane recognition data S3 outputted by the lane recognition system 223 comprises a left interval distance S3L, a right interval distance S3R, and a time for lane recognition. The lane recognition system 223 may recognize a left lane line 31 and a right lane line 32 of the lane where the self-driving vehicle 20 goes through. The left interval distance S3L is a shortest distance from the self-driving vehicle 20 to the left lane line 31. The right interval distance S3R is a shortest distance from the self-driving vehicle 20 to the right lane line 32. The time for lane recognition includes an overall time spent by the lane recognition system 223 to receive signals from its image sensors, transmit the signals, process the signals, and output the real-time lane recognition data S3. The vehicle dynamic parameters S4 outputted by the inertial measurement system comprise a heading angle φ, a sideslip angle β, a yaw rate ω, a longitudinal acceleration Ax, and a lateral acceleration g. The longitudinal acceleration Ax is the acceleration of the self-driving vehicle 20 moving forward. The vehicle information system 225 may have a steering angle detector (not shown in the figures) and a wheel speed detector (not shown in the figures). The steering angle detector is configured to detect a steering wheel angle of the self-driving vehicle 20. The wheel speed detector is configured to detect a vehicle speed of the self-driving vehicle 20. The vehicle information S5 outputted by the vehicle information system 225 may comprise the steering wheel angle $\theta_{steering}$ and the vehicle speed V.

Figure 3:
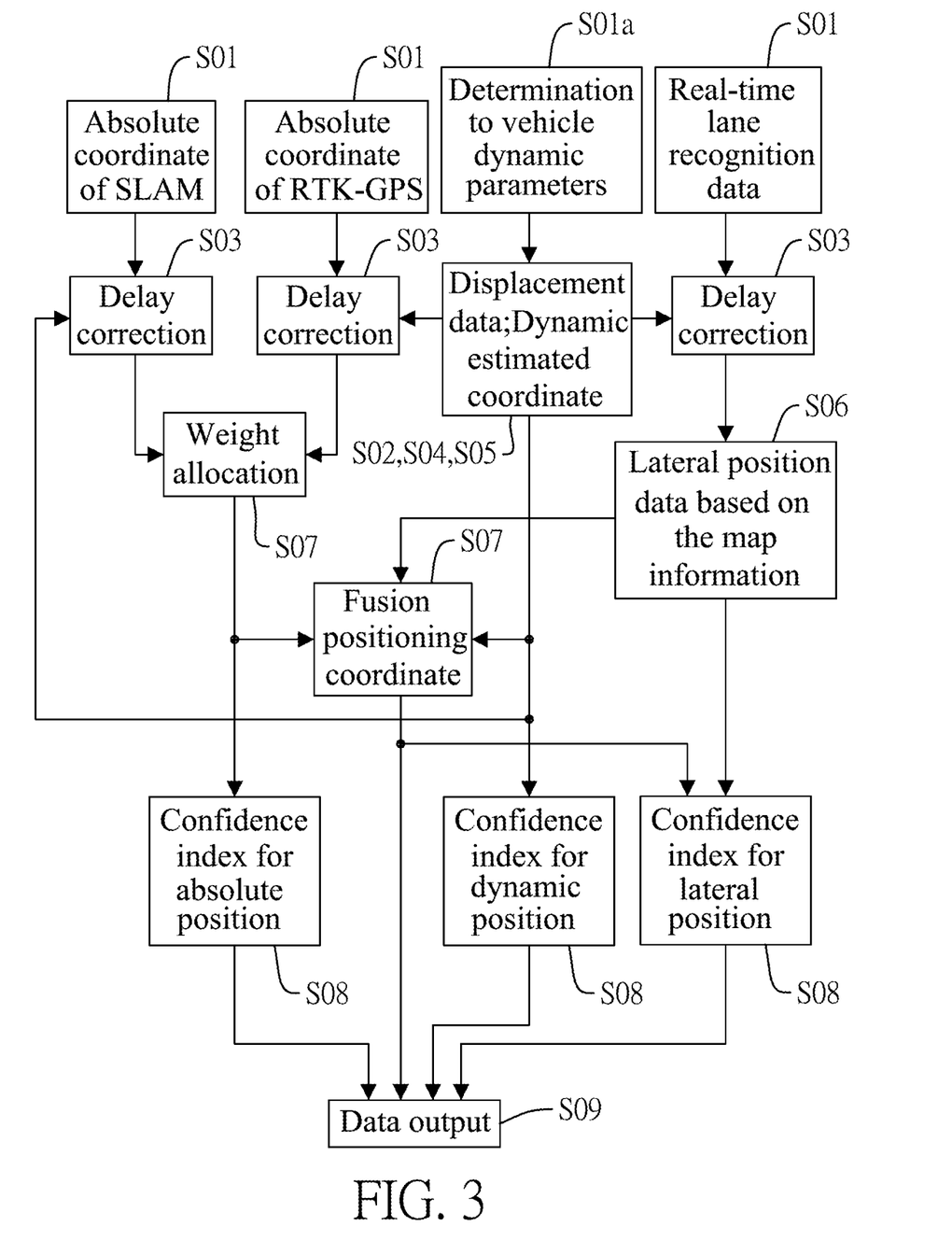
FIG. 3 is a simplified flow chart of the vehicle positioning method via data fusion of the present invention.

In the present invention, as shown in FIG. 3, the processor 10 performs a determination to the vehicle dynamic parameters (STEP S01A). When the self-driving vehicle 20 starts to move from a parking state, the processor 10 may perform zeroing and correction to basic deviations for the received vehicle dynamic parameters S4 (including the vehicle speed V, the yaw rate ω, the heading angle φ, and the sideslip angle β) firstly. While driving, the self-driving vehicle 20 may also use the Kalman filter for correction. In addition, the processor 10 computes an estimated yaw rate $\omega_E$ and further determines whether a difference between the estimated yaw rate $\omega_E$ and the yaw rate ω included in the vehicle dynamic parameters S4 is higher than a yaw-rate threshold. The yaw-rate threshold is a preset value. When the difference between the estimated yaw rate $\omega_E$ and the yaw rate ω is not higher than (such as lower than and equal to) the yaw-rate threshold, the processor 10 adopts the yaw rate ω included in the vehicle dynamic parameters S4 for further computing. The estimated yaw rate $\omega_E$ can be represented as:

$$\omega_E = \delta_{rw}\left[\frac{V}{L+\left(\frac{K_{us}}{g}\right)V^2}\right]$$

In the above-mentioned equation, $\delta_{rw}$ is the steering angle of the front wheels of the self-driving vehicle 20, V is the vehicle speed, L is the wheelbase of the self-driving vehicle 20 and is a preset value, $K_{us}$ is an understeer coefficient and is a preset value, and g is the lateral acceleration. The steering angle of the front wheel $\delta_{rw}$ can be represented as:

$\delta_{rw}=(VSR)\times\theta_{steering}$

In the above-mentioned equation, VSR indicates a ratio of the steering angle of the front wheel to the steering wheel angle and is a preset value, and $\theta_{steering}$ is the steering wheel angle.

In brief, the first positioning system 221, the second positioning system 222, the lane recognition system 223, the inertial measurement system 224, and the vehicle information system 225 as mentioned above may be conventional systems. Hence, the first real-time coordinate S1, the second real-time coordinate S2, the real-time lane recognition data S3, the vehicle dynamic parameters S4, and the vehicle information S5 outputted by them are common knowledge in the related art of the present invention. The present invention uses the data outputted by the electronic systems 22 to perform further computation described as follows.

Figure 5:
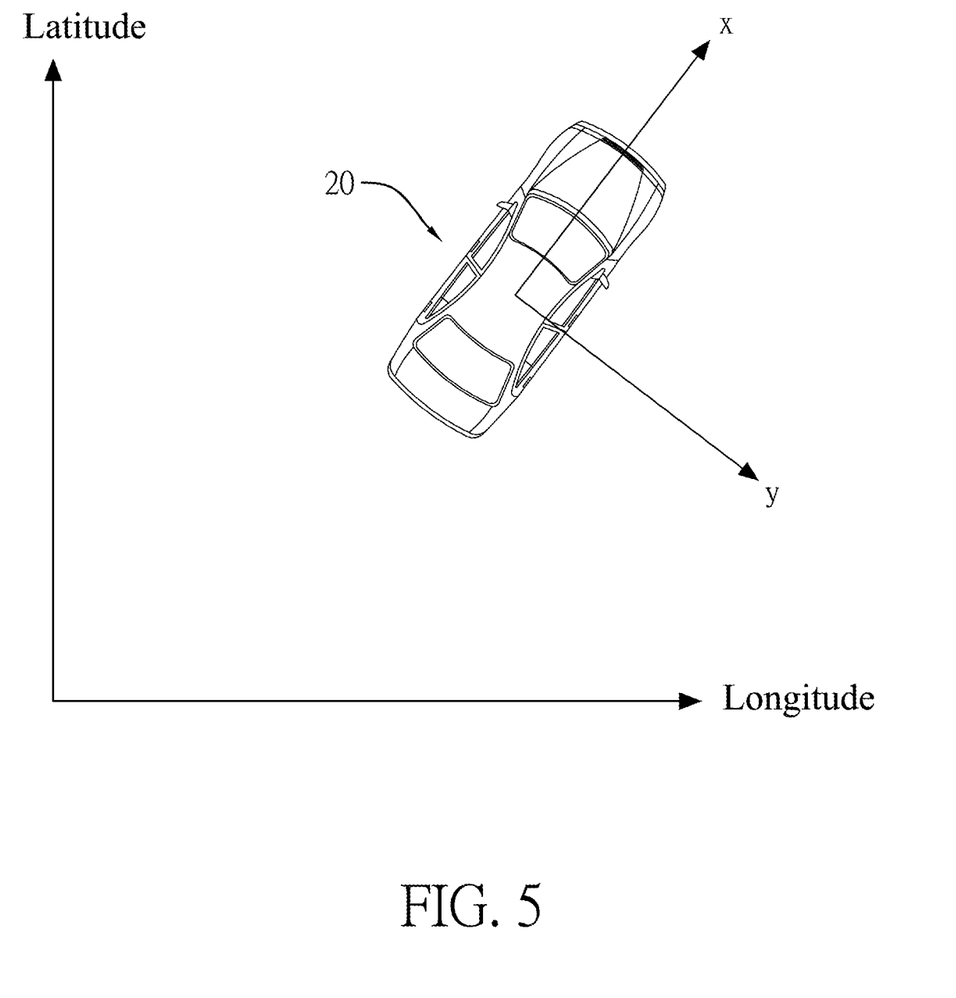
FIG. 5 is a schematic view depicting the self-driving-vehicle coordinate system and the geographic coordinate system.

The vehicle dynamic parameters S4 and the vehicle information S5 are time-varying data, such that S4 and S5 can be represented by time symbol "t" for indicating that S4 and S5 are obtained at a specific time point. For example, the heading angle can be represented as φ(t) the sideslip angle can be represented as β(t), the yaw rate can be represented as ω(t), and the vehicle speed can be represented as V(t). Besides, the processor 10 performs a coordinate transformation to the first real-time coordinate S1 and the second real-time coordinate S2, so as to transfer the coordinates to the self-driving-vehicle coordinate system from the geographic coordinate system (longitude and latitude). With reference to FIG. 5, the self-driving-vehicle coordinate system has a vertical axis (x) and a horizontal axis (y). The vertical axis (x) corresponds to a direction of the self-driving vehicle 20 moving forward (such as the heading). The horizontal axis (y) is perpendicular to the vertical axis (x). Hence, after the coordinate transformation, each one of the first real-time coordinate S1 and the second real-time coordinate S2 has a vertical coordinate value and a horizontal coordinate value.

STEP S02: As time goes on, the processor 10 computes and stores multiple displacement data according to the vehicle dynamic parameters S4 and the vehicle information S5 that are successively received. In this step, as mentioned above, the processor 10 updates the vehicle dynamic parameters S5 from the inertial measurement system 224 at a higher rate. The processor 10 can read the vehicle information S5 from the vehicle information system 225 after sending a request to the vehicle information system 225 anytime. Therefore, the present invention computes the displacement data of the self-driving vehicle 20 during two sequential time points according to the vehicle dynamic parameters S4 and the vehicle information S5 that are successively received at the two sequential time points. As time goes on, the processor 10 may successively store multiple displacement data while the self-driving vehicle 20 moves. For the sake of convenience, each one of the displacement data comprises a longitudinal component Shift_x(t) and a lateral component Shift_y(t). The longitudinal component Shift_x(t) indicates a forward or backward distance of movement of the self-driving vehicle 20 during the two sequential time points. The lateral component Shift_y(t) indicates a lateral distance of movement of the self-driving vehicle 20 during the two sequential time points.

In the present invention, the processor 10 converts the vehicle speed V(t) into a corrected vehicle speed V1(t) according to the longitudinal acceleration Ax included in the vehicle dynamic parameters S4 and multiple threshold values, and then computes the displacement data based on the corrected vehicle speed V1(t). For example, the above-mentioned threshold values comprises a first threshold value th1, a second threshold value th2, a third threshold value th3, a fourth threshold value th4, and a fifth threshold value th5, wherein th1<th2<th3<th4<th5. The processor 10 also stores a first adjustment value ad1, a second adjustment value ad2, a third adjustment value ad3, a fourth adjustment value ad4, a fifth adjustment value ad5, and a sixth adjustment value ad6. The threshold values th1-th5 and the adjustment values ad1-ad6 are preset values and are real numbers. When the processer 10 determines that th4>Ax≥th3 the processor 10 computes V1(t)=V(t)×ad4. When the processor 10 determines that th5>Ax≥th4, the processor 10 computes V1(t)=V(t)×ad5. When the processor 10 determines that Ax the processor 10 computes V1(t)=V(t)×ad6. When the processor 10 determines that th3>Ax th2, the processor 10 computes V1(t)=V(t)×ad3. When the processor 10 determines that th2>Ax≥th1, the processor 10 computes V1(t)=V(t)×ad2. When the processor 10 determines that th1>Ax, the processor 10 computes V1(t)=V(t)×ad1. In the embodiment of the present invention, th1=−1, th2=−0.4, th3=0, th4=0.2, th5=0.5, ad1=1, ad2=1.03, ad3=1.03, ad4=1.06, ad5=1.16, and ad6=1.1.

After computing the corrected vehicle speed V1(t), the processor 10 determines whether a latest yaw rate ω included in the vehicle dynamic parameters S4 is higher than or equal to a yaw-rate threshold thx. The yaw-rate threshold thx can be 0.05 (rad/second) as an example. When the processor 10 determines that ω≥thw, the longitudinal component Shift_x(t) and the lateral component Shift_y(t) computed by the processor 10 are represented as:

$$\text{Shift\_x}(t) = -\frac{V1(t)}{\omega(t)[\sin \varphi(t) + \sin(\varphi(t) + \omega(t) * \Delta t)]}$$

$$\text{Shift\_y}(t) = \frac{V1(t)}{\omega(t)[\cos \varphi(t) - \cos(\varphi(t) + \omega(t) * \Delta t)]}$$

In the above-mentioned equations, V1(t) is the corrected vehicle speed, ω(t) is the latest yaw rate, φ(t) is the heading angle included in the vehicle dynamic parameters S4, and Δt is a time gap of two yaw rates ω(t) received successively.

When the processor 10 determines that co is not higher than or equal to thw, the longitudinal component Shift_x(t) and the lateral component Shift_y(t) computed by the processor 10 are represented as:

$$\text{Shift\_}x(t) = V1(t)\cos(\varphi(t)+\beta(t))*\Delta t$$

$$\text{Shift\_}y(t) = V1(t)\sin(\varphi(t)+\beta(t))*\Delta t$$

In the above-mentioned equations, V1(t) is the corrected vehicle speed, φ(t) is a heading angle included in the vehicle dynamic parameters S4, β(t) is the sideslip angle included in the vehicle dynamic parameters S4, and Δt is a time gap of two yaw rates ω(t) or two sideslip angles β(t) received successively.

In brief, as time goes on, the processor 10 computes and stores multiple displacement data according to the vehicle dynamic parameters S4 and the vehicle information S5 that are successively received. Each one of the displacement data comprises a longitudinal component Shift_x(t) and a lateral component Shift_y(t) that are generated during two sequential time points.

Figure 6:
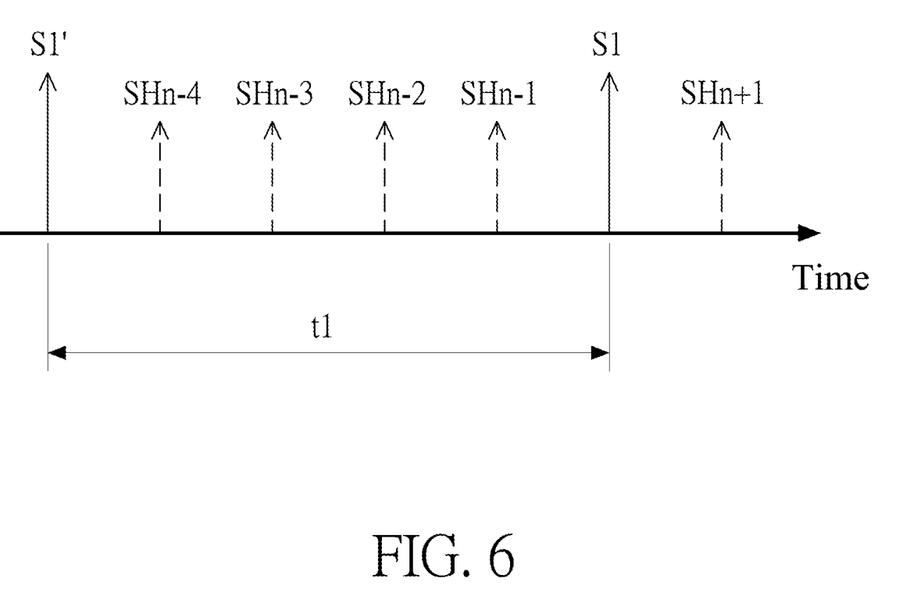
FIG. 6 is a schematic view depicting the first real-time coordinate and the displacement data.

STEP S03: Delay correction. The processor 10 performs a delay correction to the first real-time coordinate S1, the second real-time coordinate S2, and the real-time lane recognition data S3 according to the displacement data. It is to be understood that the first positioning system 221, the second positioning system 222, the lane recognition system 223, and the inertial measurement system 224 have distinct abilities, such that their data processing speed are different, and the processor 10 updates data from them at different rates respectively. In general, the inertial measurement system 224 has higher data updating rate than the first positioning system 221, the second positioning system 222, and the lane recognition system 223. For example, the data updating rates of the SLAM system, the RTK-GPS system, and the lane recognition system 223 are lower than 10 Hz. The data updating rate of the inertial measurement system 224 is around 50 Hz. With reference to FIG. 6 as an example, $(x_0, y_0)$ is the coordinate value of a first real-time coordinate S1 at present received by the processor 10. The processor 10 may compute a time gap t1 from the first real-time coordinate S1 at present to a previous first real-time coordinate S1'. The time gap t1 can be around 100 milliseconds (ms). The processor 10 can store one displacement data at every 20 milliseconds. Hence, before the processor 10 receives the first real-time coordinate S1 at present, the processor 10 has stored multiple displacement data SHn−1, SHn−2, SHn−3, and SHn−4. The processor 10 may backwardly add the displacement data SHn−1, SHn−2, SHn−3, and SHn−4 to the first real-time coordinate S1 at present for estimating the position of the self-driving vehicle 20 between the first real-time coordinate S1 at present and the previous first real-time coordinate S1'. The following description provides an example to explain the method to backwardly add the displacement data SHn−1 to the first real-time coordinate S1 at present, wherein the added coordinate value is (x(t), y(t)) represented as:

$$x(t)=x_0+\text{Shift\_}x(t)$$

$$y(t)=y_0+\text{Shift\_}y(t)$$

In the above-mentioned equations, Δt of Shift_x(t) and Shift_y(t) depends upon the SLAM computing time of the first positioning system 221. In other words, Δt in the equations of Shift_x(t) and Shift_y(t) as mentioned above can be substituted by the SLAM computing time. When the SLAM computing time of the first positioning system 221 is longer, Shift_x(t) and Shift_y(t) are larger. The delay correction for the second real-time coordinate S2 and the real-time lane recognition data S3 based on Shift_x(t) and Shift_y(t) can be deduced from the delay correction of the first real-time coordinate S1 as mentioned above.

STEP S04: The processor 10 determines levels of the first real-time coordinate S1 and the second real-time coordinate S2. In the embodiment of the present invention, the processor 10 determines the level of the first real-time coordinate S1 according to the score and the number of times of iteration included in the accompanied SLAM information.

Better level of the first real-time coordinate S1 corresponds to lower level number. When the score and the number of times of iteration are lower, the level of the first real-time coordinate S1 is higher. The following table is an example for the processor 10 to determine the level of the first real-time coordinate S1, wherein the values in the table are preset values.

| Level number of the first real-time coordinate S1 | Score | Number of times of iteration |
| --- | --- | --- |
| 0 | lower than 1 | below 6 times |
| 1 | lower than 2 | below 15 times |
| 2 | lower than 3 | below 15 times |

Similarly, the processor 10 determines the level of the second real-time coordinate S2 according to the RTK state and the INS state included in the accompanied RTK-GPS information. Better level of the second real-time coordinate S2 corresponds to lower level number. The following table is an example for the processor 10 to determine the level of the second real-time coordinate S2.

| Level number of the second real-time coordinate S2 | RTK state | INS state |
| --- | --- | --- |
| 0 | Fixed | Good |
| 1 | Float | Good |
| 2 | Others | NG |

STEP S05: The processor 10 computes a dynamic estimated coordinate according to the displacement data and one of the first real-time coordinate S1 and the second real-time coordinate S2 that has a better level. In this step, when the processor 10 receives the first real-time coordinate S1 at present and the second real-time coordinate S2 at present, the self-driving vehicle 20 is still moving. Therefore, before the processor 10 receives a next first real-time coordinate S1 or a next second real-time coordinate S2, the positon of the self-driving vehicle 20 is changing for the processor 10 to store multiple new displacement data. In order to ensure the positioning accuracy, the processor 10 adopts one of the first real-time coordinate S1 at present and the second real-time coordinate S2 at present that has the better level, and forwardly add the new displacement data to the first real-time coordinate S1 at present or the second real-time coordinate S2 at present which has the better level to generate the dynamic estimated coordinate. By doing so, the dynamic estimated coordinate is available before the next first real-time coordinate S1 or the next first real-time coordinate S2 is received. With reference to FIG. 6, for example, the first real-time coordinate S1 has the better level than the second real-time coordinate S2. The processor 10 forwardly adds the new displacement data SHn+1 to the first real-time coordinate S1 to have the dynamic estimated coordinate.

STEP S06: The processor 10 generating lateral position data according to one of the first real-time coordinate S1 and the second real-time coordinate S2 that has the better level and map information 30, and determining whether a difference between the lateral position data and the real-time lane recognition data S3 is less than a tolerable value. When the processor 10 determines that said difference is less than the tolerable value, the processor 10 computes a lateral auxiliary coordinate according to (1) one of the real-time lane recognition data S3 and the lateral position data; and (2) one of the first real-time coordinate S1 and the second real-time coordinate S2 that has a better level. In this step, with reference to FIG. 4, the map information 30 may be stored in a memory 11. The processor 10 is electrically connected to the memory 11 to read the map information 30. FIG. 7 depicts a part of the data of the map information 30. The map information 30 comprises programming codes of a left lane line 31 and a right lane line 32. Hence, the first real-time coordinate S1 has the better level than the second real-time coordinate S2 as an example. The processor 10 may compute a left lateral distance CL from the first real-time coordinate S1 to the left lane line 31, and compute a right lateral distance CR from the first real-time coordinate S1 to the right lane line 32. The lateral position data includes the left lateral distance CL and the right lateral distance CR. Then, the processor 10 determines whether a difference between the left lateral distance CL and the left interval distance S3L mentioned in STEP S01 is lower than a left lateral tolerable value, and determines whether a difference between the right lateral distance CR and the right interval distance S3R mentioned in STEP S01 is lower than a right lateral tolerable value. When the processor 10 determines that the difference between the left lateral distance CL and the left interval distance S3L is lower than the left lateral tolerable value, and the difference between the right lateral distance CR and the right interval distance S3R is lower than the right lateral tolerable value, which means the lateral position data and the real-time lane recognition data S3 are adoptable, and the processor 10 computes the lateral auxiliary coordinate according to one of the real-time lane recognition data S3 and the lateral position data.

STEP S07: The processor 10 generates a fusion positioning coordinate according to the first real-time coordinate S1 and a weight value thereof, the second real-time coordinate S2 and a weight value thereof, the dynamic estimated coordinate and a weight value thereof, and the lateral auxiliary coordinate and a weight value thereof. In this step, the fusion positioning coordinate is defined as:

$$\text{Fusion positioning coordinate} = [(\text{First real} - \text{time coordinate} * A1\% + \text{Second real} - \text{time coordinate} * A2\%) + \text{Dynamic estimated coordinate} * A3\%] + \text{Lateral auxiliary coordinate} * A4\%$$

In the above-mentioned equation, A1 is the weight value of the first real-time coordinate S1, A2 is the weight value of the second real-time coordinate S2, A3 is the weight value of the dynamic estimated coordinate, and A4 is the weight value of the lateral auxiliary coordinate. In this step, weight allocation is applied to S1 and S2, indicating the absolute positions of the self-driving vehicle 20 by A1 and A2. The processor 10 may respectively set the A1, A2, A3, and A4 according to different conditions. Corresponding to this, the following table discloses an example. The conditions and the weight values A1, A2, A3, A4 are data stored in the processor 10 and can be adjustable by user's demands. In other words, the processor 10 sets the A1, A2, A3, and A4 according to the levels of the absolute coordinate of SLAM and the absolute coordinate of RTK-GPS.

| Condition | A1 (%) | A2 (%) | A3 (%) | A4 (%) |
|---|---|---|---|---|
| 1 The level number of the absolute coordinate of SLAM is 0 | 100 | 0 | 0 | 0 |
| 2 The level number of the absolute coordinate of SLAM is 2; The level number of the absolute coordinate of RTK-GPS is 0 | 0 | 100 | 0 | 0 |
| 3 The level number of the absolute coordinate of SLAM is 2; The level number of the absolute coordinate of RTK-GPS is 1 | 0 | 40 | 30 | 30 |
| 4 The level number of the absolute coordinate of SLAM is 2; The level number of the absolute coordinate of RTK-GPS is 2 | 0 | 0 | 70 | 30 |
| 5 The level number of the absolute coordinate of SLAM is 1; The level number of the absolute coordinate of RTK-GPS is 0 | 30 | 40 | 15 | 15 |
| 6 The level number of the absolute coordinate of SLAM is 1; The level number of the absolute coordinate of RTK-GPS is 1 | 30 | 30 | 20 | 20 |

STEP S08: The processor 10 respectively determines confidence indexes of the first real-time coordinate S1, the second real-time coordinate S2, the dynamic estimated coordinate, and the lateral auxiliary coordinate. Because the present invention uses multiple different systems including the first positioning system 221, the second positioning system 222, the lane recognition system 223, and an inertial measurement system 224, the confidence of the data generated from the systems should be determined respectively. When the processor 10 determines that any one of the electronic systems 22 has lack of confidence, such electronic system 22 should be corrected, checked, or repaired. The determination for the confidence indexes is disclosed as follows.

(1) The Confidence Index for Absolute Position

With reference to the following table, the processor 10 determines whether a difference between the first real-time coordinate S1 and the second real-time coordinate S2 that are latest received is lower than or equal to a first setting value. The first setting value is a preset value. The processor 10 outputs a first confidence index according to a determination result that said difference is lower than or equal to the first setting value or not. The first confidence index is text message or code.

| | Determination result | Content of the first confidence index |
|---|---|---|
| Whether a difference between the first real-time coordinate S1 and the second real-time coordinate S2 that are latest received is lower than or equal to a first setting value | Yes | Text message or code for indicating "Trustworthy"; The difference between the first real-time coordinate S1 and the second real-time coordinate S2 |
| | No | Text message or code for indicating "Unavailable". The difference between the first real-time coordinate S1 and the second real-time coordinate S2 |

(2) The Confidence Index for Dynamic Position

With reference to the following table, after the processor 10 computes the dynamic estimated coordinate, the processor 10 determines whether a difference between the fusion positioning coordinate and the dynamic estimated coordinate is lower than a second setting value within a duration threshold, and outputs a second confidence index according to a determination result that said difference is lower than the second setting value within the duration threshold or not. The second setting value and the duration threshold are preset values.

| | Determination result | Content of the second confidence index |
|---|---|---|
| Whether a difference between the fusion positioning coordinate and the dynamic estimated coordinate is lower than a second setting value within a duration threshold | Yes | Text message or code for indicating "Highly trustworthy" |
| | No | Text message or code for indicating "Low trustworthy" |

(3) The Confidence Index for Lateral Position

As mentioned above, the processor 10 has generated the lateral position data based on the map information 30 in STEP S06, and has generated the fusion positioning coordinate in STEP S07. With reference to the following table, the processor 10 determines whether a difference between the fusion positioning coordinate and the lateral position data is lower than or equal to a third setting value. The third setting value is a preset value. The processor 10 outputs a third confidence index according to a determination result that said difference is lower than or equal to the third setting value or not. The third confidence index is a text message or a code.

| | Determination result | Content of the third confidence index |
|---|---|---|
| Whether a difference between the fusion positioning coordinate and the lateral position data is lower than or equal to a third setting value | Yes | Text message or code for indicating "Highly trustworthy" |
| | No | Text message or code for indicating "Lateral departure too long" |

In brief, in STEP S08, the confidence indexes determined by the processor 10 include the first confidence index, the second confidence index, and the third confidence index.

STEP S09: The processor 10 outputs the first real-time coordinate S1, the second real-time coordinate S2, and the real-time lane recognition data S3 that are processed by the delay correction, the fusion positioning coordinate, and the confidence indexes to the self-driving-vehicle controller 21 for a self-driving operation. In other words, the data generated by the processor 10 through STEP S01 to STEP S08 includes the first real-time coordinate S1, the second real-time coordinate S2, and the real-time lane recognition data S3 that are processed by the delay correction (based on STEP S02), the fusion positioning coordinate (based on STEP S07), and the confidence indexes (based on STEP S08), such that the data is provided with the self-driving-vehicle controller 21 for the self-driving operation.

In conclusion, when the self-driving-vehicle controller 21 performs the self-driving operation to the self-driving vehicle 20 according to the data as mentioned in STEP S09, the accuracy to control the self-driving vehicle 20 can be improved and the phenomenon that the positioning information received by the self-driving vehicle 20 is temporarily unavailable can be reduced. Besides, after the self-driving-vehicle controller 21 receives the low confidence indexes, the self-driving-vehicle controller 21 can perform a secure defensive driving in advance, so as to control the steering system 24 and the power train system 25 of the self-driving vehicle 20. As a result, the self-driving vehicle 20 can be controlled to decelerate or park at the roadside, for preventing traffic accidents or emergency braking.

What is claimed is:

1. A vehicle positioning method via data fusion, performed by a processor electrically connected to a self-driving-vehicle controller and multiple electronic systems, wherein the self-driving-vehicle controller, the multiple electronic systems, and the processor are all mounted in a same self-driving vehicle, and comprising steps of:
   step (a): receiving a first real-time coordinate, a second real-time coordinate, real-time lane recognition data, multiple vehicle dynamic parameters, and multiple vehicle information of the same self-driving vehicle from the multiple electronic systems respectively;
   step (b): as time goes on, computing and storing multiple displacement data according to the vehicle dynamic parameters and the vehicle information that are successively received;
   step (c): performing a delay correction to the first real-time coordinate, the second real-time coordinate, and the real-time lane recognition data according to the displacement data;
   step (d): determining levels of positioning accuracy of the first real-time coordinate and the second real-time coordinate;
   step (e): computing a dynamic estimated coordinate according to the displacement data and one of the first real-time coordinate and the second real-time coordinate that has a better level of positioning accuracy than the other;
   step (f): generating lateral position data according to one of the first real-time coordinate and the second real-time coordinate that has the better level of positioning accuracy and map information, and determining whether a difference between the lateral position data and the real-time lane recognition data is less than a tolerable value, and when the processor determines that the difference is less than the tolerable value, computing a lateral auxiliary coordinate according to
      one of the real-time lane recognition data and the lateral position data; and
      one of the first real-time coordinate and the second real-time coordinate that has the better level of positioning accuracy than the other;
   step (g): generating a fusion positioning coordinate according to the first real-time coordinate and a weight value thereof, the second real-time coordinate and a weight value thereof, the dynamic estimated coordinate and a weight value thereof, and the lateral auxiliary coordinate and a weight value thereof;
   step (h): respectively determining confidence indexes of the first real-time coordinate, the second real-time coordinate, the dynamic estimated coordinate, and the lateral auxiliary coordinate; and
   step (i): outputting the first real-time coordinate, the second real-time coordinate, and the real-time lane recognition data that are processed by the delay correction, the fusion positioning coordinate, and the confidence indexes to the self-driving-vehicle controller for a self-driving operation.

2. The vehicle positioning method via data fusion as claimed in claim 1, wherein in step (a):
   the first real-time coordinate is an absolute coordinate of simultaneous localization and mapping (SLAM);
   the second real-time coordinate is an absolute coordinate of real-time kinematic-global positioning system (RTK-GPS);
   the real-time lane recognition data comprises a left interval distance and a right interval distance;
   the vehicle dynamic parameters comprise a heading angle, a sideslip angle, a yaw rate, a longitudinal acceleration, and a lateral acceleration;
   the vehicle information comprises a steering wheel angle and a vehicle speed.

3. The vehicle positioning method via data fusion as claimed in claim 1, wherein the processor computes an estimated yaw rate and determines whether a difference between the estimated yaw rate and a yaw rate included in the vehicle dynamic parameters is higher than a yaw-rate threshold; and when the difference is not higher than the yaw-rate threshold, the processor adopts the yaw rate included in the vehicle dynamic parameters for computing.

4. The vehicle positioning method via data fusion as claimed in claim 1, wherein in step (b):
   each one of the displacement data comprises a longitudinal component and a lateral component;
   when the processor determines that a latest yaw rate included in the vehicle dynamic parameters is higher than or equal to a yaw-rate threshold, the longitudinal component and the lateral component are defined as:

$$\text{Shift\_x}(t) = -\frac{V1(t)}{\omega(t)[\sin \varphi(t) + \sin(\varphi(t) + \omega(t) * \Delta t)]}$$

$$\text{Shift\_y}(t) = \frac{V1(t)}{\omega(t)[\cos \varphi(t) - \cos(\varphi(t) + \omega(t) * \Delta t)]}$$

wherein Shift_x(t) is the longitudinal component, Shift_y(t) is the lateral component, V1(t) is a corrected vehicle speed, ω(t) is the latest yaw rate, φ(t) is a heading angle included in the vehicle dynamic parameters, and Δt is a time gap of two yaw rates ω(t) received successively;
when the processor determines that the latest yaw rate included in the vehicle dynamic parameters is lower than the yaw-rate threshold, the longitudinal component and the lateral component are defined as:

$$\text{Shift\_x}(t) = V1(t)\cos(\varphi(t)+\beta(t))*\Delta t$$

$$\text{Shift\_y}(t) = V1(t)\sin(\varphi(t)+\beta(t))*\Delta t$$

wherein Shift_x(t) is the longitudinal component, Shift_y(t) is the lateral component, V1(t) is a corrected vehicle speed, φ(t) is a heading angle included in the vehicle dynamic parameters, β(t) is a sideslip angle included in the vehicle dynamic parameters, and Δt is a time gap of two yaw rates ω(t) or two sideslip angles β(t) received successively;
the processor converts a vehicle speed included in the vehicle information to the corrected vehicle speed according to a longitudinal acceleration included in the vehicle dynamic parameters and multiple threshold values.

5. The vehicle positioning method via data fusion as claimed in claim 1, wherein in step (c):
   the processor performs the delay correction by backwardly adding the displacement data to the first real-time coordinate, the second real-time coordinate, and the real-time lane recognition data.

6. The vehicle positioning method via data fusion as claimed in claim 1, wherein in step (f):
- the map information comprises programming codes of a left lane line and a right lane line;
- the processor computes a left lateral distance from one of the first real-time coordinate and the second real-time coordinate that has the better level of positioning accuracy than the other to the left lane line, and computes a right lateral distance from one of the first real-time coordinate and the second real-time coordinate that has the better level of positioning accuracy than the other to the right lane line, wherein the lateral position data includes the left lateral distance and the right lateral distance;
- the processor determines whether a difference between the left lateral distance and the left interval distance is lower than a left lateral tolerable value, and determines whether a difference between the right lateral distance and the right interval distance is lower than a right lateral tolerable value;
- when the processor determines that the difference between the left lateral distance and the left interval distance is lower than the left lateral tolerable value, and the difference between the right lateral distance and the right interval distance is lower than the right lateral tolerable value, the processor computes the lateral auxiliary coordinate according to one of the real-time lane recognition data and the lateral position data.

7. The vehicle positioning method via data fusion as claimed in claim 1, wherein in step (g):
the fusion positioning coordinate is defined as:

$$\text{Fusion positioning coordinate} = \\ [(\text{First real} - \text{time coordinate} * A1\% + \text{Second real} - \\ \text{time coordinate} * A2\%) + \text{Dynamic estimated coordinate} * A3\%] + \\ \text{Lateral auxiliary coordinate} * A4\%$$

wherein A1, A2, A3, and A4 are weight values respectively;
the processor sets A1, A2, A3, and A4 according to the level of positioning accuracy of the first real-time coordinate and the level of positioning accuracy of the second real-time coordinate;
the first real-time coordinate is an absolute coordinate of simultaneous localization and mapping (SLAM);
the second real-time coordinate is an absolute coordinate of real-time kinematic-global positioning system (RTK-GPS).

8. The vehicle positioning method via data fusion as claimed in claim 1, wherein in step (h):
- the processor determines whether a difference between the first real-time coordinate and the second real-time coordinate that are latest received is lower than or equal to a first setting value, and outputs a first confidence index according to a determination result thereof, wherein the first confidence index is a text message or a code;
- after the processor computes the dynamic estimated coordinate, the processor determines whether a difference between the fusion positioning coordinate and the dynamic estimated coordinate is lower than a second setting value within a duration threshold, and outputs a second confidence index according to a determination result thereof, wherein the second confidence index is a text message or a code;
- the processor determines whether a difference between the fusion positioning coordinate and the lateral position data is lower than or equal to a third setting value, and outputs a third confidence index according to a determination result thereof, wherein the third confidence index is a text message or a code.

9. A vehicle positioning system via data fusion, comprising:
- a self-driving-vehicle controller;
- multiple electronic systems respectively outputting a first real-time coordinate, a second real-time coordinate, real-time lane recognition data, multiple vehicle dynamic parameters, and multiple vehicle information; and
- a processor electrically connected to the self-driving-vehicle controller and the electronic systems, wherein the self-driving-vehicle controller, the multiple electronic systems and the processor are all mounted in a same self-driving vehicle, to respectively receive the first real-time coordinate, the second real-time coordinate, the real-time lane recognition data, the vehicle dynamic parameters, and the vehicle information of the same self-driving vehicle from the electronic systems, and computing and storing multiple displacement data according to the vehicle dynamic parameters and the vehicle information that are successively received;
- the processor performing a delay correction to the first real-time coordinate, the second real-time coordinate, and the real-time lane recognition data according to the displacement data;
- the processor determining levels of positioning accuracy of the first real-time coordinate and the second real-time coordinate, computing a dynamic estimated coordinate according to the displacement data and one of the first real-time coordinate and the second real-time coordinate that has a better level of positioning accuracy than the other, generating lateral position data according to one of the first real-time coordinate and the second real-time coordinate that has the better level of positioning accuracy and map information, and determining whether a difference between the lateral position data and the real-time lane recognition data is less than a tolerable value, and when the processor determines that the difference is less than the tolerable value, computing a lateral auxiliary coordinate according to:
  - one of the real-time lane recognition data and the lateral position data; and
  - one of the first real-time coordinate and the second real-time coordinate that has the better level of positioning accuracy;
- the processor generating a fusion positioning coordinate according to the first real-time coordinate and a weight value thereof, the second real-time coordinate and a weight value thereof, the dynamic estimated coordinate and a weight value thereof, and the lateral auxiliary coordinate and a weight value thereof, and respectively determining confidence indexes of the first real-time coordinate, the second real-time coordinate, the dynamic estimated coordinate, and the lateral auxiliary coordinate;
- the processor outputting the first real-time coordinate, the second real-time coordinate, and the real-time lane recognition data that are processed by the delay correction, the fusion positioning coordinate, and the confidence indexes to the self-driving-vehicle controller for a self-driving operation.

10. The vehicle positioning system via data fusion as claimed in claim 9, wherein the electronic systems comprise:

a first positioning system which is a simultaneous localization and mapping (SLAM) system to output the first real-time coordinate;

a second positioning system which is a real-time kinematic-global positioning system (RTK-GPS) to output the second real-time coordinate;

a lane recognition system to output the real-time lane recognition data;

an inertial measurement system to output the vehicle dynamic parameters; and a vehicle information system to output the vehicle information;

wherein the map information is stored in a memory;

wherein the processor is electrically connected to the memory to read the map information.

* * * * *